(12) United States Patent
Dettinger et al.

(10) Patent No.: US 7,917,606 B2
(45) Date of Patent: *Mar. 29, 2011

(54) METHOD AND SYSTEM FOR MESSAGE MANAGEMENT

(75) Inventors: Richard Dean Dettinger, Rochester, MN (US); Brian E. Olson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 452 days.

This patent is subject to a terminal disclaimer.

(21) Appl. No.: 12/034,396

(22) Filed: Feb. 20, 2008

(65) Prior Publication Data

US 2008/0147819 A1  Jun. 19, 2008

Related U.S. Application Data

(62) Division of application No. 10/007,891, filed on Nov. 13, 2001, now abandoned.

(51) Int. Cl.
*G06F 15/177* (2006.01)

(52) U.S. Cl. ........ 709/221; 709/220; 709/219; 709/228; 709/232; 709/216; 707/4; 707/8

(58) Field of Classification Search .................. 709/232, 709/217, 219, 220, 221, 223, 228, 238, 246; 707/8, 10, 4; 711/173, 153, 147; 719/313, 719/314

See application file for complete search history.

(56) References Cited

U.S. PATENT DOCUMENTS

| | | | | |
|---|---|---|---|---|
| 5,315,508 A | * | 5/1994 | Bain et al. | .......... 705/28 |
| 5,627,766 A | * | 5/1997 | Beaven | .......... 702/122 |
| 5,878,056 A | | 3/1999 | Black et al. | |
| 5,878,420 A | * | 3/1999 | de la Salle | .......... 1/1 |
| 6,092,096 A | | 7/2000 | Lewis | |
| 6,094,694 A | | 7/2000 | Hickson et al. | |
| 6,182,143 B1 | | 1/2001 | Hastings et al. | |
| 6,226,641 B1 | | 5/2001 | Hickson et al. | |
| 6,473,760 B1 | * | 10/2002 | Klatt et al. | .......... 1/1 |
| 6,651,099 B1 | * | 11/2003 | Dietz et al. | .......... 709/224 |
| 6,760,761 B1 | * | 7/2004 | Sciacca | .......... 709/220 |
| 2003/0037040 A1 | * | 2/2003 | Beadles et al. | .......... 707/1 |
| 2003/0093576 A1 | | 5/2003 | Dettinger et al. | |
| 2006/0100889 A1 | | 5/2006 | Gosko | |

OTHER PUBLICATIONS

Office Action Dated Jun. 2, 2005 for U.S. Appl. No. 10/007,891.
Final Office Action Dated Nov. 17, 2005 for U.S. Appl. No. 10/007,891.
Office Action Dated Aug. 10, 2006 for U.S. Appl. No. 10/007,891.
Final Office Action Dated Aug. 9, 2007 for U.S. Appl. No. 10/007,891.
Office Action Dated Mar. 3, 2008 for U.S. Appl. No. 10/007,891.
Final Office Action Dated Sep. 3, 2008 for U.S. Appl. No. 10/007,891.

(Continued)

*Primary Examiner* — Barbara N Burgess
(74) *Attorney, Agent, or Firm* — Patterson & Sheridan, LLP

(57) ABSTRACT

Methods and systems for message format distribution. A sending server is connected to a plurality of receiving servers. The sending server comprises a master database containing information which is periodically provided to the receiving servers. The sending server and the receiving servers communicate using messaging facilities. Changes in the message format are distributed by the sending server to the receiving servers via the messaging facilities. The message format changes are implemented by receiving clients executing on each of the receiving servers. Standard configurable receiving clients are used by all receiving servers, thereby reducing or eliminating development work by the receiving parties.

11 Claims, 6 Drawing Sheets

OTHER PUBLICATIONS

Office Action for U.S. Appl. No. 10/007,891, Dated Jun. 2, 2005 (IBMK10265).
Final Office Action for U.S. Appl. No. 10/007,891, Dated Nov. 17, 2005 (IBMK10265).
Office Action for U.S. Serial No. Dated Aug. 10, 2006 (IBMK10265).
Final Office Action for U.S. Serial No. Dated Aug. 9, 2007 (IBMK10265).

* cited by examiner

*— 344*

LOG

TABLE 1 *— 602A*

Table: ORDERHEADER
    Field: ORDERNUMBER,10,CHAR
    Field: ORDERSTATUS,2,CHAR

TABLE 2 *— 602B*

Table: ORDERDETAIL
    Field: ORDERNUMBER,10,CHAR
    Field: ITEMNUMBER,10,CHAR
    Field: ITEMCOST,15.2 DECIMAL

*Fig. 6*

METHOD AND SYSTEM FOR MESSAGE MANAGEMENT

CROSS-REFERENCED TO RELATED APPLICATIONS

This application is a divisional of U.S. patent application Ser. No. 10/007,891, filed Nov. 13, 2001 now abandoned, which is herein incorporated by reference.

BACKGROUND OF THE INVENTION

1. Field of the Invention

The present invention generally relates to data processing systems and communications systems. More particularly, the invention relates to messaging.

2. Description of the Related Art

Messaging and queuing is a method of inter-program communication which allows programs to send and receive application-specific data without having a direct connection established between them. A message consists of two parts—application data and a message descriptor containing control information. The application data in a message is defined and supplied by the application program which sends the message. There are no constraints on the nature of the data in a message (for example, it could consist of one or more bit strings, character strings, binary integers, etc). Applications view the string of bits and bytes that make up a message as consisting of a sequence of items which each have a particular meaning and data type. In addition to the application data, a message has associated with it some ancillary data. This is information that specifies the properties of the message, and is used by the message queuing service to decide how the message should be processed. Some of this information must be specified by the sending application.

A message queue is a named object in which messages accumulate and from which they are later removed. Each queue belongs to one particular queue manager, which is the system service that provides the message-queuing facilities used by applications. The queue manager is responsible for the maintenance of that queue. When messages are added to a queue, they are added at the end, and when messages are taken from a queue they are normally removed from the front (although facilities do exist for reading messages in other than FIFO order). The physical representation of a message queue depends on the environment, but can be a buffer or buffers in main storage, a file or files on disk or other permanent storage device, or both of these. The physical management of message queues is entirely the responsibility of a queue manager, and such details are not made apparent to application programs. Applications can view a message queue simply as a "black box" in which messages accumulate. Applications have access to message queues by using message queuing API calls—obtaining message queueing services by using the message queueing calls to communicate with the queue manager that is installed on the same system as the application (i.e. the local queue manager).

Applications communicate by agreeing to use particular named message queues, sending messages to the specific target queues that the application programs have agreed to read from. The locations of these queues need not be apparent to the applications which send the messages; each application interacts only with its local queue manager, and it is the network of interconnected queue managers that is responsible for moving the messages to the intended queues. In this way, the message queuing software greatly simplifies the level of complexity that is required of the application programs, removing the need for them to implement their own complex communications controls.

One environment which uses messaging to advantage is a database environment. Databases are computerized information storage and retrieval systems. One common database is known as a relational database management system (RDBMS), which is a computer database management system that uses relational techniques for storing and retrieving data. Databases are computerized information storage and retrieval systems in which data in the form of tables (formally denominated "relations") are typically stored for use on disk drives or similar mass data stores. A "table" includes a set of rows (formally denominated "tuples" or "records") spanning several columns. Data in the tables is stored, retrieved and deleted using high-level query languages, such as the Structured Query Language (SQL). Reference is made to C. J. Date, *An Introduction to Database Systems,* 6th edition, Addison-Wesley Publishing Co. Reading, Mass. (1994) for a comprehensive general treatment of the database art.

Commonly, database management systems (DBMS) are part of a distributed system comprising a plurality of servers and clients, as in the case of the client-server model. Typically, the clients and servers communicate via a local area network (LAN) or wide area network (WAN) using well-known protocols such as Transmission Control Protocol and Internet Protocol (TCP/IP). The clients typically make requests to the servers, which manage one or more databases. Once a response for the client's request is formulated, the response is provided to the client.

One illustrative networked database environment 100 using messaging to advantage is shown in FIG. 1. In general, the networked database environment 100 comprises a sending server 102 in communication with a plurality of receiving servers 120$_1$, 120$_2$, ... 120$_N$ (collectively referred to as the receiving servers 120). The sending server 120 includes a database 104 containing a plurality of tables (not shown). The information contained in the database 104 is accessed by a sending application 106. In general, the sending application 106 accesses the database 104 in the event of a modification of the data contained in the database 104. The sending application 106 then places the information (in the form of a message) on a sending queue 110 of a messaging facility 108. The message is then sent to each of the receiving servers 120 via a dedicated Channel 112$_1$, 112$_2$, ... 112$_N$ established over a network connection 114 (e.g., a TCP/IP connection).

Each of the receiving servers 120 includes a messaging facility 122$_1$, 122$_2$, ... 122$_N$ (collectively referred to as the messaging facilities 122), a custom receiving application 126$_1$, 126$_2$, ... 126$_N$ (collectively referred to as the custom receiving applications 126) and a custom database 128$_1$, 128$_2$, ... 128$_N$ (collectively referred to as the custom databases 128). Incoming messages from the sending server 102 are received on a receiving queue 124 of the messaging facility 122. The messages may then be retrieved from the receiving queue 124 by the custom receiving application 126. Ultimately, the messages are written to the custom database 128 to update the information contained therein.

In a typical implementation, the sending server 102 is a data warehouse configured to send data changes to the receiving servers 120, which are datamarts. For example, the data warehouse may be a master repository of information for a plurality of products, while each datamart maintains information for only selected products. As a result, each receiving server 120 (i.e., each datamart) may only be interested in a portion of a data change. Accordingly, each custom receiving application 126 is configured to extract and store only selected information (i.e., information specific to a product(s) of interest to the datamart).

Occasionally, the message format of the message containing the data changes is itself changed. Accordingly, a developer/administrator (a human being) of the sending server 102 is responsible for defining a new common message format and then providing the new common message format to the receiving servers 120. This management role of the sending server developer/administrator is complicated by the fact that each of the receiving servers 120 has its own custom receiving application 126. In the most common implementation, the developer/administrator of the sending server 102 engages each developer (a human being) of the receiving servers 120 to review the message format. The message format is provided to the developer of each receiving server 120 via electronic mail, conventional mail or some other similar service. Each receiving server developer then develops and tests a custom receiving client that complies with the message format. Once the clients have been successfully configured, the receiving servers 120 may begin receiving data updates from the sending server 102. Each update to the data warehouse generates a plurality of messages, a single message for each datamart receiving client. Upon receiving the message, each receiving client extracts data specific to their datamart application.

Accordingly, the message format distribution, the custom development, and the testing each involve manual operations that contribute to inefficient operation. As a result, it would be preferable to eliminate or reduce the overhead involved in distribution, development, and testing.

Therefore, there is a need for an improved method and system for messaging management.

SUMMARY OF THE INVENTION

The present invention generally provides methods and systems for messaging management.

A first embodiment provides a method for processing messages received from a sending database management system. The method comprises receiving, on a message queue, a configuration message from the sending database management system, wherein the configuration message contains message formatting information; and generating a configuration file according to message formatting information so that the configuration file contains mapping rules for processing subsequently received messages. In one embodiment, the configuration message comprises a first plurality of fields and the configuration file maps the first plurality of fields to a second plurality of fields of one or more database tables in a database.

In another embodiment, the foregoing method is implemented by executing a program contained on a computer readable medium.

Yet another embodiment provides a database system comprising a database, a messaging facility configured to receive messages from a sending system via a network connection, and a receiving application configured to retrieve the messages from the messaging facility. The receiving application is configured to generate a configuration file according to a configuration message, wherein the configuration file contains mapping rules established by the configuration message. The receiving application is further configured to write data received in a data message to the database according to the mapping rules.

Still another embodiment provides a networked system of databases comprising a sending server computer and a plurality of receiving server computers connected to the sending server computer via a network connection. The sending server computer comprises a master database and a sending messaging facility configured to send messages including configuration messages containing message format information and data messages containing data updates. The plurality of receiving server computers each comprise a receiving messaging facility configured to receive the messages from the sending server computer system, a database, and a receiving application. The receiving application is configured to retrieve the messages from the messaging facility, and configured to generate a configuration file according to a configuration message received from the sending server computer, wherein the configuration file contains mapping rules established by the configuration message. The receiving application is further configured to write data received in a data message received from the sending server computer to the database according to the mapping rules.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6 is an illustrative transaction log.

DETAILED DESCRIPTION OF THE PREFERRED EMBODIMENTS

The present invention provides embodiments for message format distribution. Standard configurable receiving clients are used by all receiving parties, thereby reducing or eliminating development work by the receiving parties.

Figure 3:
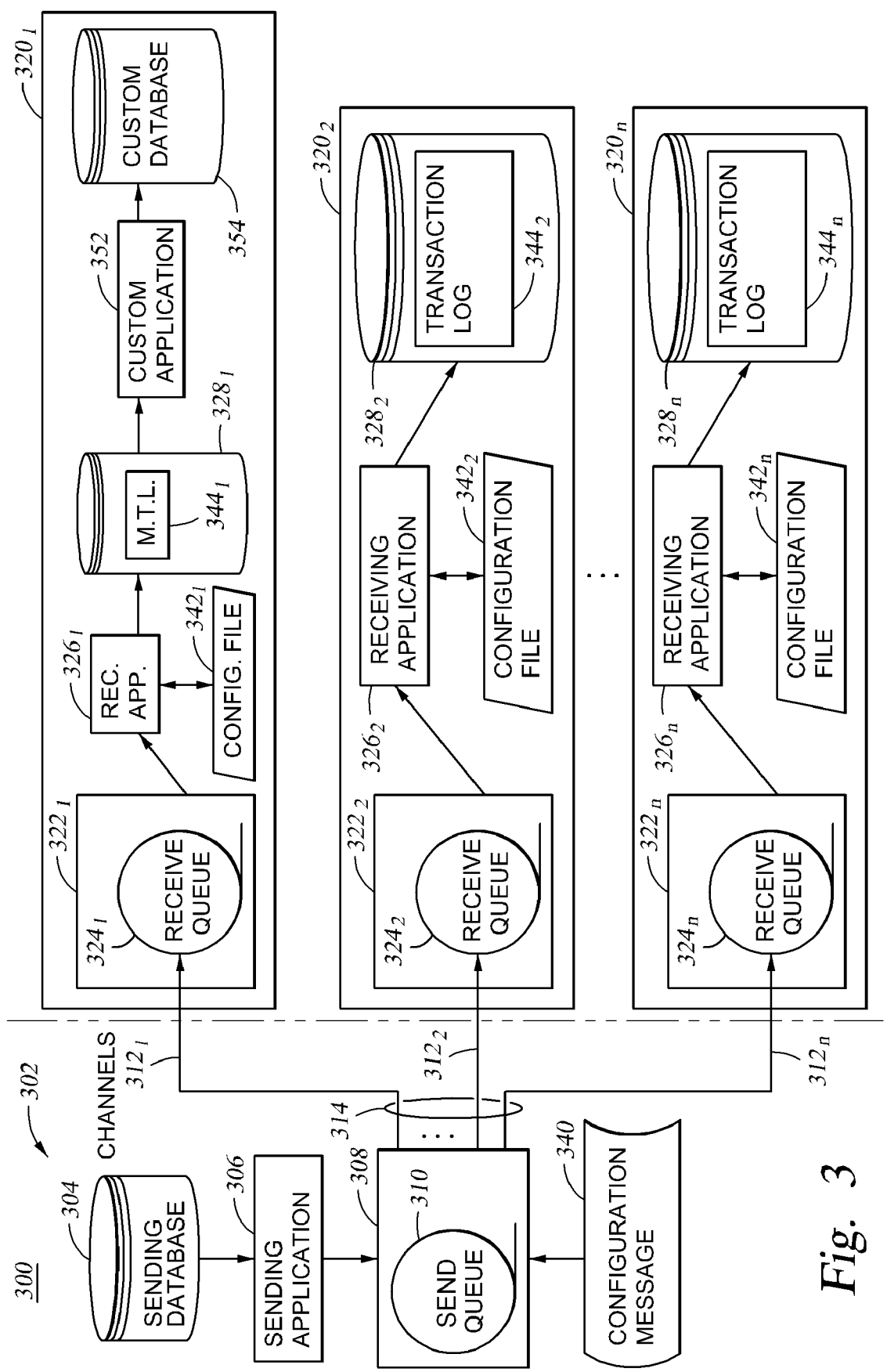
FIG. 3 is an illustrative networked database environment in which message format changes are distributed via messaging facilities and implemented by standard configurable clients executing on the receiving servers.

One embodiment of the invention is implemented as a program product for use with a computer system such as, for example, the network database environment 300 shown in FIG. 3 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to as a "program" "application", "client" or other meaningful nomenclature. The inventive computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The present invention may be implemented within many different data processing systems and communications systems. The invention may be implemented in a computer program product which is adapted for use with any computer. For example, suitable data processing systems in which the invention may be used are IBM's RISC System/6000 computers, eSeries computers, iSeries computers, pSeries computers, zSeries computers, etc. Illustrative operating systems which may be used to advantage include IBM's AIX operating system, IBM's OS/390, Linux and Windows. According to one embodiment, the invention is implemented in a message-oriented middleware (computer program) product such as a product within IBM's MQSeries family of commercial messaging software products. The products within the MQSeries product family are each adapted to run on a specific one of a large number of different hardware and operating system platforms. Any one of these MQSeries products may implement the invention. More generally, any messaging product may be used to advantage including, for example, Java Messaging Service (JMS). In another embodiment, the invention is implemented as a stand-alone product which may be used in tandem with message-oriented middleware such as IBM's MQSeries family of software products. (IBM, MQSeries, RISC System/6000, PS/2, OS/2 and AIX are trademarks of International Business Machines Corporation.)

Figure 1:
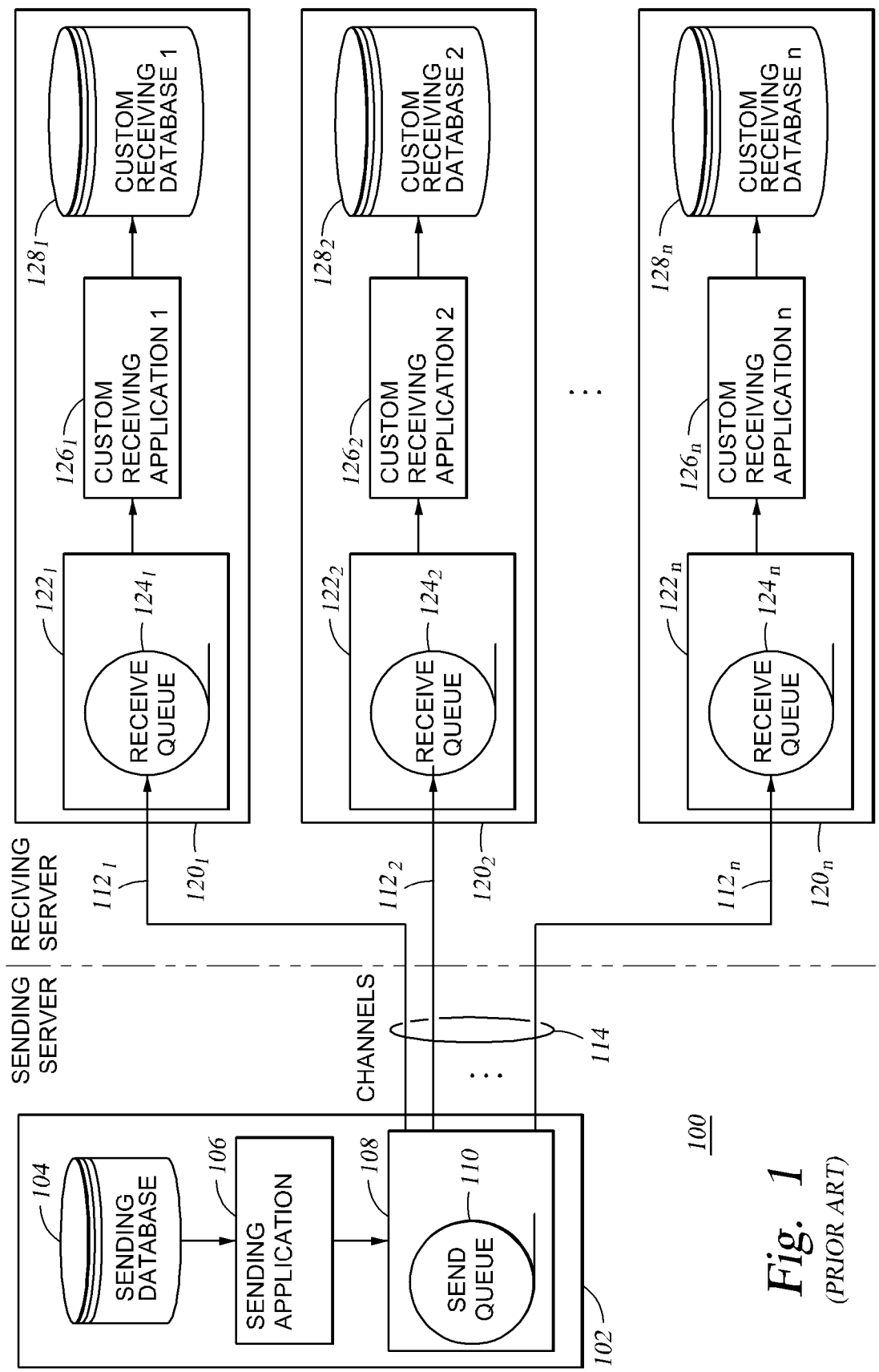
FIG. 1 is an illustrative networked database environment using messaging to advantage.
Figure 2:
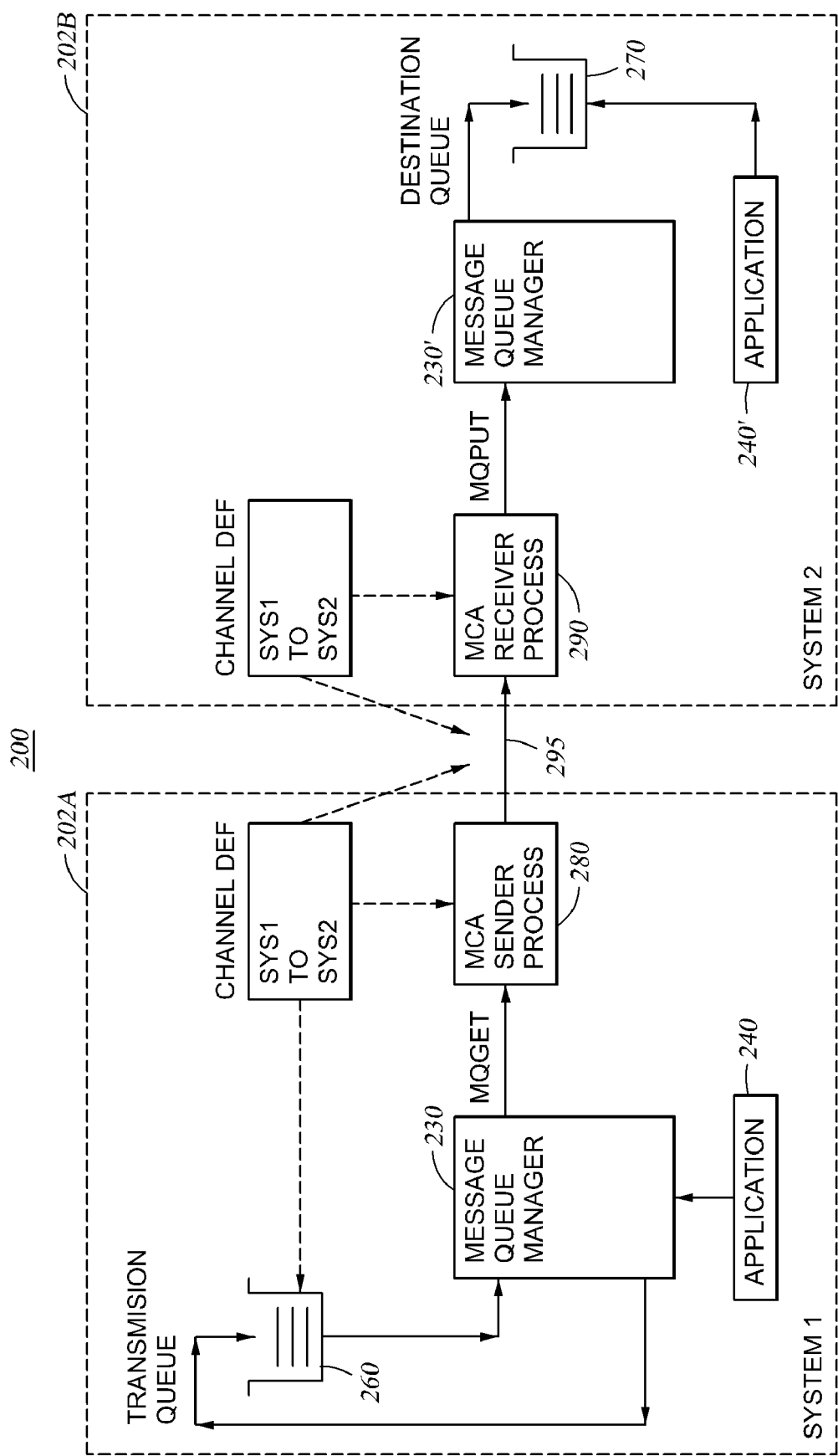
FIG. 2 is an illustrative messaging environment.

Using the communications support of a messaging facility (such as IBM's MQSeries products), communication between application programs is via message queues, as will be described with reference to FIG. 2. FIG. 2 is shows a messaging environment 200 comprising a pair of systems 202A and 202B in communication with one another. Each system 202A, 202B may represent a computer, such as the ones described above. As such, each computer may include a processor, memory, storage, I/O devices and the like. Illustratively, the system 202A is a sending machine and the system 202B is a receiving machine. The systems 202A and 202B are configured with a messaging facility that allows communication between applications 240, 240'. Illustratively, the applications 240, 240' are the business applications run by a system user (e.g., an airline passenger booking facility run by a travel agency, the product catalog and ordering software for a product(s), etc.). The messaging facility of each system comprises at least one queue 260 (system 202A), 270 (system 202B) and a queue manager 230 (system 202A), 230' (system 202B). In general, the messaging facility may be communication-supporting software interfacing with the system's operating system.

In operation, a sender application 240 sends data via a message which it places onto a queue in storage, for a receiver application 240' to subsequently retrieve when it is ready. Every queue in a system belongs to a queue manager, and the queue manager provides access to the queues in response to requests from application programs (or from administration tools). There is no requirement for a logical connection between the application programs themselves and the use of queues controlled by queue managers facilitates asynchronous communication, so each application program can run independently. The queue manager software provides for reliable storage of queued messages, not deleting a message from a sender system until it has been safely stored at the receiver system.

Application programs can put messages onto local queues that are managed by a local queue manager program 230 (and which queues are held in the main memory or disk storage of the local system) and retrieve messages from them. A remote queue is one that belongs to a queue manager other than the one to which the application directly connects. For example, the queue 270 is remote relative to the application 240. Access to a remote queue involves communication between the local queue manager 230 and the remote queue manager 230'. Applications can place messages on remote queues but cannot read messages from them.

Queue managers 230, 230' may store messages onto a number of different queues. If a message from the first system 202A is eventually to be processed by the remote application 240', the queue manager 230 stores the message in the special local queue known as the transmission queue 260. When the queue manager 230 receives a request to put a message on the remote destination queue 270, it puts the message on a particular transmission queue 260 which is associated with the queue manager 230' which is the target for the request. A transmission queue forms one end of the link between a pair of queue managers. All messages whose immediate destination (i.e. the next step of their transfer across a network) is the same queue manager can be placed in the same transmission queue, regardless of their final destination. Thus, only one transmission queue is generally needed for moving messages in one direction from one queue manager to another, although there can be more than one. Transmission queues containing messages to be sent to queues belonging to remote queue managers enable the movement of messages to remote queues to be carried out in stages between adjacent queue managers. The staging of message transfer is invisible to the application programs involved in the communication.

The messages on a transmission queue are extended by the queue manager to include a transmission queue header in addition to the application message (the data being transferred by an application). The transmission queue header is an architected descriptor containing the name of the destination queue and the message descriptor. Messages on destination queues include the application data and a message header specifying control information.

The transport relationship between two queue managers is known as a channel. The key elements defining a channel are the name of a transmission queue, information concerning the transport processes or programs 280, 290 which send or receive messages over the channel (these processes, which are part of the queue managers, are known as message channel agents—hereafter MCAs), and communications protocol and target system information for the destination to which messages on the transmission queue are to be sent. The association between a particular channel definition and the various data model entities involved in the message communication is represented by broken lines in FIG. 3. Each named channel is defined in both the sending and receiving systems 202A-B. The channel name is used in the transmissions between the sender and receiver processes to identify the channel to the receiver or for a receiver to request that messages from a particular channel be sent. Channel definition has some information which is common for all environments and some which depends on the operating system environment and underlying communications protocol to be used.

The communication of messages between queue managers is carried out by MCAs working in pairs across specific channels: one sender 280 and one receiver 290. Thus, a channel is effectively used as a uni-directional pipe between systems. A pair of MCA processes uses a transport connection 295 such as a VTAM APPC session or a TCP/IP connection as a transport layer.

Illustratively, there are four types of MCAs: Sender, Receiver, Requester and Server. The Receiver MCA takes messages from a transmission queue and sends them to a Receiver or Requester. The Receiver receives messages and queues them. The Requester sends a single message to cause a Sender or Server to be started remotely. The Server is started by a message from a requester, and then becomes a Sender.

An MCA 280 dequeues messages from transmission queues and transmits them over the transport connection 295. The receiving MCA 290 queues the messages to the destination queue 270 named in the message header. In the case where the destination queue is more than one hop from the original transmission queue, the receiving MCA will queue the message on another transmission queue for the next hop. This provides a safe store and, in the event that the next connection is unavailable, the necessary asynchronism to allow this first stage of transmission to still be carried out. The message format and the safe movement protocol are transport layer independent so that MCAs can support different transport protocols on different channels.

Before any messages or data can flow down a channel, the two MCAs which are to use it must first negotiate the way in which they are going to communicate. Thus, channel initialization involves negotiation of certain protocol parameters, such as which communication partner is going to do any needed conversion of control and message header data. Two MCAs may be running on systems using two different data formats. For example, one may be using ASCII and the other EBCDIC. One may be encoding numbers left to right, the other right to left. The control information and message header data must be converted from the sender's representation to the receiver's. Data conversion over channels applies only to control information (such as destination queue name, control field lengths, and the like): no application data conversion is performed by MCAs, since MCAs do not need to interact with the application data in a message when they transmit it.

In operation, an application 240 sends a message to a target destination queue (e.g., queue 270) for processing by another application 240' by issuing an MQPUT command. The local queue manager 230 reads the destination queue name specified by the application 240 in the message's header and determines where to put the message. The unit of work including the operation of putting the message to a queue must be committed before the message is available to other applications. An application serving that local queue can then asynchronously issue MQGET to take the message from the queue for processing.

If the destination queue is not the responsibility of the local queue manager 230 (as in the case of queue 270), then the local queue manager 230 puts the message onto a local transmission queue 260, for transfer to another queue manager 230'. There may be a plurality of transmission queues defined for each queue manager, but a one-to-one correspondence between transmission queues and remote destination queues is not necessary. All messages that are to be passed between two adjacent queue managers (that is, all messages to be sent from a first queue manager which have a common nearest neighbor queue manager in the direction of their respective target destination queue managers) can be put in the same transmission queue. It is equally possible to have a number of transmission queues for traffic going to the same next node.

The local queue manager (or an end user) starts a sender MCA 280 to transmit messages to the next queue manager 230'. The sender MCA 280 then gets messages (by issuing MQGET) from the transmission queue 260 owned by this queue manager 230 and transmits them to the destination queue manager 230'. Each message is either transmitted in one transmission or as a plurality of transmission segments in a plurality of transmissions if the messages are too large for the transport connection to send in one package (e.g. a message might be 4 Megabytes in size and the maximum transfer size 32 kilobytes).

The receiver MCA 290 receives the messages and the receiver queue manager 230' determines where each message is to be sent (as the sending queue manager program did previously). The receiver queue manager 230' puts the messages (using MQPUT) within a syncpoint-manager-controlled unit of work to queues belonging to the receiving queue manager 230', which may be the actual application-specified destination queue for a particular message or may be a related transmission queue for the next hop towards the target system. For purposes of illustration, it is assumed that the queue 270 is the destination queue for messages prepared by the application 240.

To complete the assured delivery of messages following successful queuing by the receiving queue manager 230', the target application 240' which services the destination queue 270 can issue MQGET to get messages from the queue 270 as part of a unit of work under the control of its local syncpoint manager, to allow rollback of the message to the queue in case of application failure or commit of a successfully processed message to delete it.

The following aspects of messaging can be used to advantage to implement a messaging subscription system and method. Embodiments of messaging subscription will be described with reference to FIG. 3. FIG. 3 shows an illustrative networked database environment 300. In general, the networked database environment 300 comprises a sending server 302 in communication with a plurality of receiving servers $320_1, 320_2, \ldots 320_N$ (collectively referred to as the receiving servers 320). Illustratively, the sending server 302 is a data warehouse configured to send data changes to the receiving servers 320, which are datamarts. The sending server 302 includes a database 304 containing a plurality of tables (not shown). The information contained in the database 304 is accessed by a sending application 306. The sending application 306 then places the information (in the form of a message) on a sending queue 310 of a messaging facility 308. The message is then sent to each of the receiving servers 320 via a dedicated Channel $312_1, 312_2, \ldots 312_N$ established over a network connection 314 (e.g., a TCP/IP connection).

Each of the receiving servers 320 includes a messaging facility $322_1, 322_2, \ldots 322_N$ (collectively referred to as the messaging facilities 322), a receiving client $326_1, 326_2, \ldots$ 326_N (collectively referred to as the receiving clients 326 or receiving applications 326) and a database 328_1, 328_2, ... 328_N (collectively referred to as the databases 328). Incoming messages from the sending server 302 are received on a receiving queue 324_1, 324_2, ... 324_N (collectively referred to as the receiving queues 324) of the messaging facility 322. The messages may then be retrieved from the receiving queue 324 by the receiving client 326. Ultimately, the messages are written to the database 328 to update the information contained therein.

From time to time, the format of messages distributed by the sending server 302 may change. Accordingly, the receiving servers 320 must be configured to recognize the new message format. To this end, the sending server 302 generates a messaging management service configuration message 340. The configuration message 340 contains configuration information for each receiving client 326. For a distribution of a given message format, the same configuration message 340 is provided to each receiving client 326. An illustrative embodiment of a configuration message 340 will be described below with reference to FIG. 4.

In operation, the configuration message 340 is placed on the sending queue 310 and then transmitted to each receiving queue 324 of the respective messaging facilities 322. The configuration message 340 can then be retrieved from the receiving queue 324 by the respective receiving client 326. In contrast to the prior art, the receiving client 326 is not a custom application, but rather a standardized application executing on each receiving server 320. As a result, manual customization of the receiving server 320 in response to a message format change is not necessary. Instead, the receiving client 326 is itself responsible for implementing the message format changes indicated in the configuration message 340. To this end, the receiving client 326 is configured to open and extract information from the configuration message 340. Using the information contained in the configuration message 340, each receiving client 326 builds a respective messaging management service configuration file 342_1, 342_2, ... 342_N (collectively referred to as the configuration files 342). The configuration files 342 drive the logic of subsequent data extraction by the receiving servers 320 for messages received from the sending server 302. One embodiment of a configuration file 342 is described below with reference to FIG. 5.

In addition to creating the configuration file 342, the receiving client 326 also creates a transaction log 344. The transaction log 344 stores the data extracted by the receiving clients 326 from messages received from the sending server 302. Initially, the newly created transaction log 344 is an empty container containing a plurality of tables, each configured according to the mapping rules of the configuration file 342. The tables may then be populated with data extracted from subsequently received messages. In one embodiment, the overwritten information may be archived according to methods known in the art.

Figure 4:
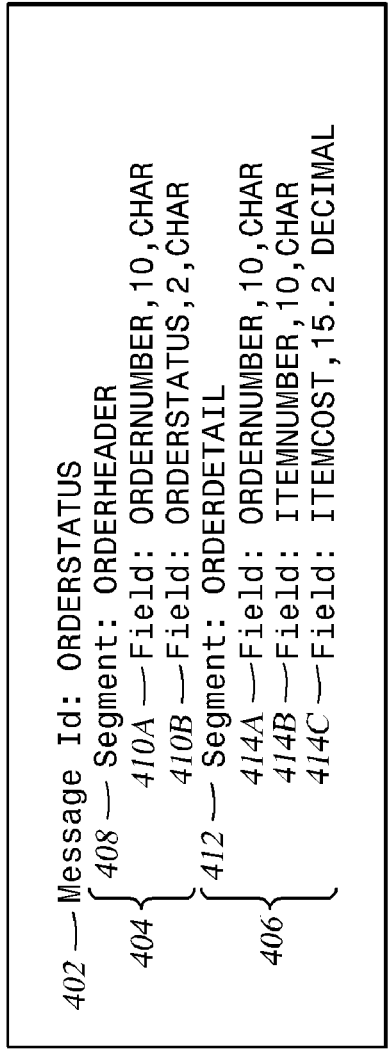
FIG. 4 is an illustrative configuration message.

One embodiment of a data structure representative of the configuration message 340 is shown in FIG. 4. In general, the configuration message 340 is hierarchical, with a highest level being a message identifier (ID) 402. The message identifier 402 names a message type. Illustratively, the configuration message 340 shown in FIG. 4 is an ORDERSTATUS type message. Other illustrative message types may include INVOICE, HARDWARE, SOFTWARE, etc. In this manner, subsequent messages with data updates may be configured with a message ID recognizable by the receiving client 326, which may then handle the message appropriately.

The configuration message 340 further includes one or more segments 404, 406, each of which has associated fields. Each segment 404, 406 is identified by segment ID 408, 412. Illustratively, the configuration message 340 shown in FIG. 4 includes two segments 404, 406. However, more generally, the configuration message 340 may include any number of segments. Illustratively, a first segment 404 includes two fields 410A, 410B and a second segment 406 includes three fields 414A-C. Each field within a segment describes the length and type of data contained in a message. For example, a first field 410A of the first segment 408 describes an ORDERNUMBER data type having a length of ten characters. In this manner, the segments and associated fields describe the format of messages that will be subsequently received and processed by the receiving client 326.

Figure 5:
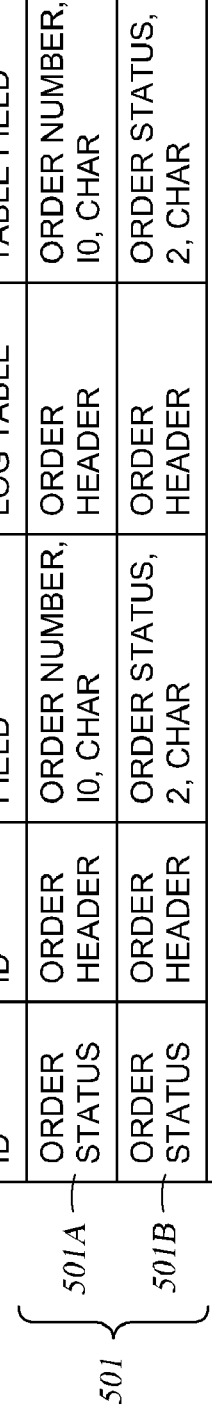
FIG. 5 is an illustrative configuration file.

As described above, the information contained in the configuration message 340 is then used to create the configuration file 342. The configuration file 342 maps the configuration message information to appropriate locations within transaction log tables. One embodiment of a configuration file 342 is shown in FIG. 5. In general, the configuration file 342 is organized as a plurality of columns and rows 501A, 501B (collectively referred to as rows 501), where each row defines a record containing the mapping rule for one field of one segment of one message type. Illustratively, the configuration file 342 includes a message ID column 502, a segment ID column 504, a segment fields column 506, a transaction log table column 508 and a transaction table field column 510. The record entries of the message ID column 502 contain the message ID 402 extracted from the configuration message 340. The record entries of the segment ID column 504 contain the segment ID (e.g., segment ID 408, 412) extracted from the configuration message 340. The segment field column 506 contains data type and length information for a particular field of the segment specified by the segment ID in the same row 501. The record entries of the transaction log table column 508 contain the table name to which the message data should be written. Illustratively, the table is named according to the segment ID. The transaction table field column 510 specifies the appropriate format of a field in the table according to the information contained in the corresponding row entry of the segment field column 506. For brevity, only to rows are shown in the configuration file 342 of FIG. 5. In practice, however, a row is provided for each field specified in a configuration message 340.

One embodiment of the transaction log 344 is shown in FIG. 6. In general, the transaction log 344 contains a plurality of tables. Each table is configured to contain data for a particular message type, as defined by the message ID 402 of the configuration message 340. Illustratively, only two tables 602A, 602B are shown in the transaction log 344. In practice, however, a table is provided for each combination of fields associated with a particular segment of a message. By way of illustration, a first table 602A is formatted and populated according to the mapping rules provided in the first and second rows 501A-B of the configuration file 342. A second table 602B is similarly formatted according to mapping rules corresponding to the ORDERDETAIL segment 412 of the configuration message 340. For simplicity, the mapping rules for the second table 602B are not shown in the configuration file 342. However, the mapping rules for the second table 602B would be similarly arranged to the mapping rules for the first table 602A.

Figure 7:
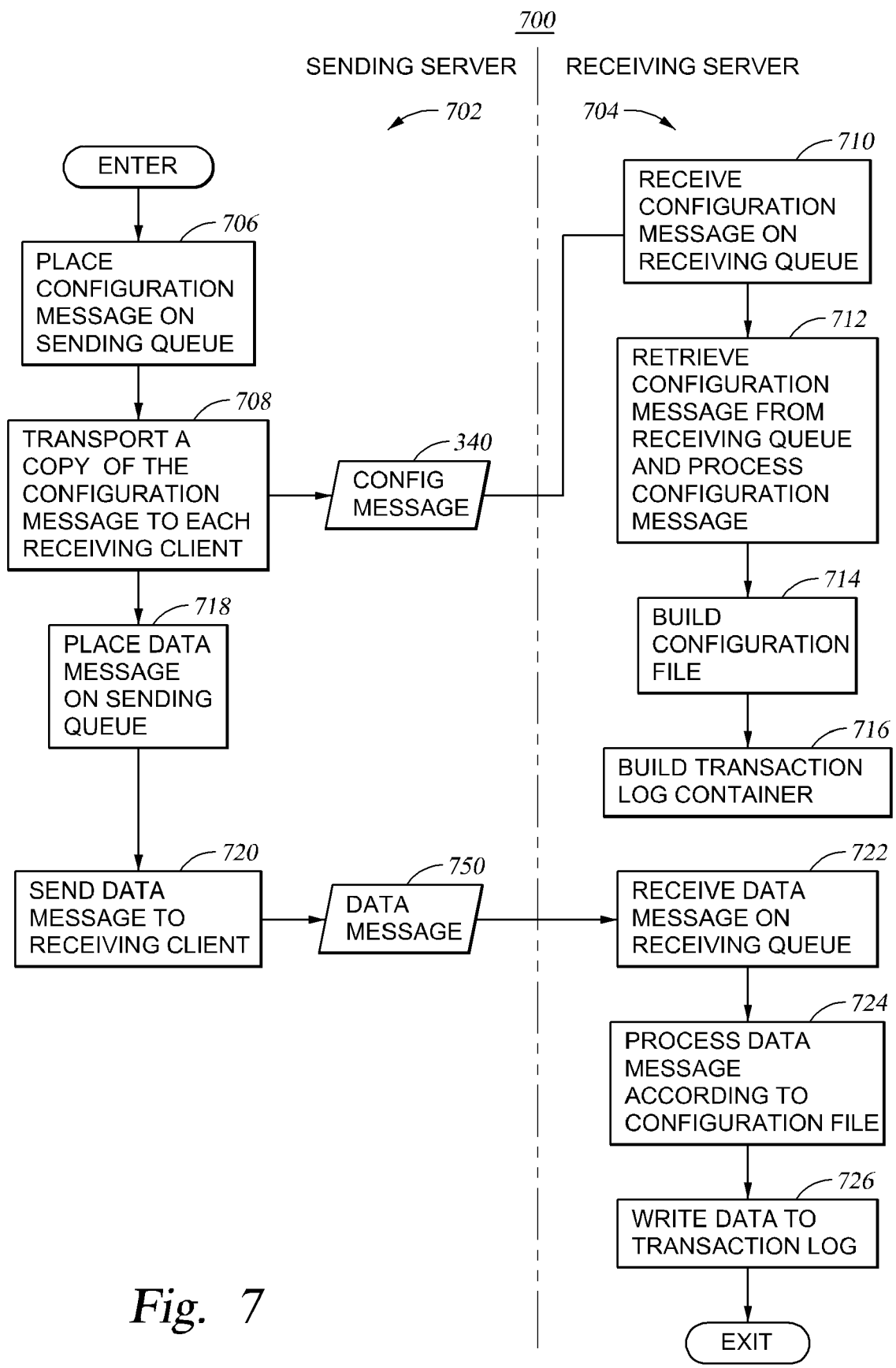
FIG. 7 is a method illustrating the operation of the networked database environment of FIG. 3.

The operation of the networked data environment 300 will now be described according to a method 700 as illustrated in FIG. 7. In general, the method 700 includes a sending server routine 702 (implemented by the sending server 302) and a receiving server routine 704 (implemented by the receiving server 320). Although the receiving server routine 704 is representative of the operations implemented by a single receiving server 320, it is understood that each of the receiving servers 320 may implement the same routine. The server routine 702 is entered at step 706 once a sending server developer has prepared a configuration message 340 for transport to each of the receiving servers 320. At step 706, the configuration message 340 is placed on the sending queue 310. At step 708, a copy of the configuration message 340 is transported to each of the receiving servers 320.

The configuration message 340 is received on the receiving queue 324 of each respective receiving server 320, at step 710. At step 712, the receiving client 326 retrieves the configuration message 340 from the receiving queue 324. Once the configuration message 340 has been parsed, the receiving client 326 operates to build the configuration file 342, at step 714. In addition, the transaction log 344 is formatted at step 716. The configuration file 342 and the transaction on 344 are formatted according to the information contained in the configuration message 340. The receiving server 320 is now ready to begin receiving data messages to populate the tables contained in the transaction log 344.

At step 718, the sending server 302 places a data message 750 on the sending queue 310. At step 720, the data message 750 is sent to each of the receiving clients 320. The data message 750 is received on the receiving queues 324 of each of the receiving servers 320, at step 722. At steps 724 and 726, the data message 750 is extracted by the receiving client 326 and written to the transaction log 344 according to the mapping rules of the configuration file 342.

In some cases, it may be desirable for developers/administrators of the receiving servers 320 to maintain a custom application and custom database. Such an implementation is illustrated in FIG. 3. In particular, a first receiving server $320_1$ includes a custom application 350 configured to access the database $328_1$. The information retrieved from the database $328_1$ by the custom application 350 is then stored to a custom database 352. In this manner, developers/administrators of receiving servers 320 may achieve an additional degree of control over the data provided by the sending server 302. The automated data processing implemented by the receiving client 326 still provides advantages because each receiving server 320 receives data from the sending server without first having to develop and test a custom application in the event of a message format change. Accordingly, development and testing does not postpone receipt of valuable information from the sending server 302. Further, development and testing is limited to those receiving servers 320 that desire to maintain a custom application and custom database. Accordingly, a net reduction in overhead is realized on a networked system-level.

While the foregoing is directed to embodiments of the present invention, other and further embodiments of the invention may be devised without departing from the basic scope thereof, and the scope thereof is determined by the claims that follow.

What is claimed is:

1. A networked system of databases, comprising:
   a plurality of receiving server computers connected to a sending server computer via a network connection, each of the plurality of receiving server computers comprising:
      a receiving messaging facility configured to receive a configuration message and data messages from the sending server computer, wherein the configuration message contains message format information defining formatting of the data messages containing data updates, wherein the message format information is used to correctly extract the data updates from the data messages and comprises: (A) a message type, (B) one or more field names, (C) one or more field lengths, and (D) one or more field data types and wherein the data messages are received subsequent to the configuration message, whereby the configuration message defines formatting of the subsequently-received data messages;
      a database; and
      a receiving application configured to retrieve the messages from the receiving messaging facility, and configured to:
         generate a configuration file according to the configuration message received from the sending server computer, wherein the configuration file contains mapping rules for processing the subsequently-received data messages, wherein the mapping rules are established by the configuration message; and
         write data received in at least one of the data messages received from the sending server computer to the database according to the mapping rules.

2. The system of claim 1, wherein the sending server computer comprises a sending messaging facility and wherein the sending messaging facility and each receiving messaging facility comprise at least one queue.

3. The system of claim 1, wherein the sending server computer comprises a sending messaging facility connected to each receiving messaging facility by a channel.

4. The system of claim 1, wherein the configuration message comprises a first plurality of fields and wherein the configuration file maps the first plurality of fields to a second plurality of fields of one or more database tables in the receiving server computer databases.

5. The system of claim 1, wherein at least one of the receiving server computers further comprises a custom application configured to access selected data from the database of the at least one receiving server computer and write the selected data to a custom database of the at least one receiving server computer.

6. A networked system of databases, comprising:
   (a) a sending server computer, comprising:
      a sending messaging facility configured to send messages including:
         (i) a configuration message containing message format information defining formatting of subsequently-sent data messages containing data updates,
            wherein the message format information is used to correctly extract the data updates from the data messages and comprises: (A) a message type, (B) one or more field names, (C) one or more field lengths, and (D) one or more field data types; and
         (ii) the data messages; and
      a master database;
   (b) a plurality of receiving server computers connected to the sending server computer via a network connection, each of the plurality of receiving server computers comprising:
      a receiving messaging facility configured to receive the messages from the sending server computer, wherein the data messages are received subsequent to the configuration message, whereby the configuration message defines formatting of the subsequently-received data messages;
      a database; and
      a receiving application configured to retrieve the messages from the receiving messaging facility, and configured to:

generate a configuration file according to the configuration message received from the sending server computer, wherein the configuration file contains mapping rules for processing the subsequently-received data messages, wherein the mapping rules are established by the configuration message; and write data received in at least one of the data messages received from the sending server computer to the database according to the mapping rules;

wherein the sending messaging facility and each receiving messaging facility comprise at least one queue, and wherein the configuration message comprises a first plurality of fields and wherein the configuration file maps the first plurality of fields to a second plurality of fields of one or more database tables in the receiving server computer databases.

7. The system of claim 6, wherein the sending messaging facility is connected to each receiving messaging facility by a channel.

8. The system of claim 6, wherein at least one of the receiving server computers further comprises a custom application configured to access selected data from the database of the at least one receiving server computer and write the selected data to a custom database of the at least one receiving server computer.

9. A networked system of databases, comprising:
(a) a sending server computer, comprising:
a sending messaging facility configured to send messages including:
(i) a configuration message containing message format information defining formatting of subsequently-sent data messages containing data updates wherein the message format information is used to correctly extract the data updates from the data messages and comprises: (A) a message type, (B) one or more field names, (C) one or more field lengths, and (D) one or more field data types; and
(ii) the data messages; and
a master database;
(b) a plurality of receiving server computers connected to the sending server computer via a network connection, each of the plurality of receiving server computers comprising:
a receiving messaging facility configured to receive the messages from the sending server computer, wherein the data messages are received subsequent to the configuration message, whereby the configuration message defines formatting of the subsequently-received data messages;
a database; and
a receiving application configured to retrieve the messages from the receiving messaging facility, and configured to:
generate a configuration file according to the configuration message received from the sending server computer, wherein the configuration file contains mapping rules for processing the subsequently-received data messages, wherein the mapping rules are established by the configuration message; and
write data received in at least one of the data messages received from the sending server computer to the database according to the mapping rules;

wherein the configuration message comprises a first plurality of fields and wherein the configuration file maps the first plurality of fields to a second plurality of fields of one or more database tables in the receiving server computer databases, and wherein at least one of the receiving server computers further comprises a custom application configured to access selected data from the database of the at least one receiving server computer and write the selected data to a custom database of the at least one receiving server computer.

10. The system of claim 9, wherein the sending messaging facility and each receiving messaging facility comprise at least one queue.

11. The system of claim 9, wherein the sending messaging facility is connected to each receiving messaging facility by a channel.

* * * * *